US012798858B2

(12) United States Patent
Kim et al.

(10) Patent No.: US 12,798,858 B2
(45) Date of Patent: Nov. 17, 2026

(54) GLASS WEB ASSEMBLIES HAVING TAILORED EDGE PROTECTION AND RELATED METHODS

(71) Applicant: CORNING INCORPORATED, Corning, NY (US)

(72) Inventors: EuiHo Kim, Asan-si (KR); Ga-Hyun Kim, Asan-si (KR); Junwoo Kim, Asan-si (KR); Cheol Hee Park, Asan-si (KR)

(73) Assignee: CORNING INCORPORATED, Corning, NY (US)

(*) Notice: Subject to any disclaimer, the term of this patent is extended or adjusted under 35 U.S.C. 154(b) by 160 days.

(21) Appl. No.: 18/714,146

(22) PCT Filed: Nov. 17, 2022

(86) PCT No.: PCT/US2022/050251
§ 371 (c)(1),
(2) Date: May 29, 2024

(87) PCT Pub. No.: WO2023/101826
PCT Pub. Date: Jun. 8, 2023

(65) Prior Publication Data

US 2025/0033856 A1 Jan. 30, 2025

Related U.S. Application Data

(60) Provisional application No. 63/284,068, filed on Nov. 30, 2021.

(51) Int. Cl.

| | |
|---|---|
| ***B65D 81/05*** | (2006.01) |
| ***C09J 7/00*** | (2018.01) |

(52) U.S. Cl.
CPC .............. *B65D 81/053* (2013.01); *C09J 7/00* (2013.01); *C09J 2301/18* (2020.08); *C09J 2301/204* (2020.08)

(58) Field of Classification Search
CPC ................................ B65D 81/053; C09J 7/00
USPC .......................................................... 428/121
See application file for complete search history.

(56) References Cited

U.S. PATENT DOCUMENTS

| | | | | |
|---|---|---|---|---|
| 9,034,458 | B2 | 5/2015 | Li | |
| 2011/0023548 | A1 | 2/2011 | Garner et al. | |
| 2013/0134202 | A1* | 5/2013 | Garner | B65H 18/103 226/52 |
| 2017/0120420 | A1* | 5/2017 | Forenz | B24C 1/045 |

(Continued)

FOREIGN PATENT DOCUMENTS

| | | | |
|---|---|---|---|
| KR | 97-0001790 | U | 1/1997 |
| KR | 10-2014-0096455 | A | 8/2014 |
| KR | 10-1602424 | B1 | 3/2016 |

OTHER PUBLICATIONS

International Search Report and Written Opinion of the International Searching Authority; PCT/US2022/050251; mailed on Mar. 7, 2023, 8 pages; European Patent Office.

(Continued)

*Primary Examiner* — Tahseen Khan
(74) *Attorney, Agent, or Firm* — John P. McGroarty

(57) ABSTRACT

Various embodiments for an assembly including a glass web having a tailored edge tape of having discontinuous adhesive portions are provided herein.

5 Claims, 8 Drawing Sheets

(56) References Cited

U.S. PATENT DOCUMENTS

2018/0044560 A1* 2/2018 Lyon ...................... C09J 115/00

OTHER PUBLICATIONS

Korean Patent Application No. 10-2024-7021623, Office Action dated Jul. 22, 2026, 2 pages (English Translation only), Korean Patent Office.

* cited by examiner

GLASS WEB ASSEMBLIES HAVING TAILORED EDGE PROTECTION AND RELATED METHODS

CROSS-REFERENCE TO RELATED APPLICATIONS

This application is a national stage entry under 35 U.S.C. § 371 of International Application No. PCT/US2022/050251, filed on Nov. 17, 2022, which claims the benefit of priority under 35 U.S.C. § 119 of U.S. Provisional Application No. 63/284,068, filed Nov. 30, 2021, the content of each of which is incorporated herein by reference in its entirety.

FIELD OF THE INVENTION

Broadly, the present disclosure is directed towards tailored edge tape designs, which include various embodiments of discontinuous adhesive configured along the tape member and positioned at the edges of the glass web, such that advantaged and/or improved down-stream processing and/or customization is realized while protecting the edges of the glass web during processing. More specifically, the edge tape itself is configured with tailored adhesive area designs which are configured to enable partial peel-off of the edge tape (e.g. by hand or automation) in the customizing process, followed by implementation of an automatic cross-cut system for the customizing process.

BACKGROUND

Thin, flexible glass has edge tape configured along its edges, so that during processing, the flexible glass web isn't chipped or broken. Currently, there are several labor-intensive steps to effectively remove the edge tape so that the glass web can be customized (i.e. laterally cut) to customer requirements. Challenges remain to efficiently process the glass web in situ.

SUMMARY

The present disclosure includes various embodiments of a glass web assembly having edge tape with discontinuous adhesive configurations, such that the edge tape is configured to protect the glass web during conveyance and processing, but is also configured to have improved removability as compared to previous edge-taped glass webs, given the present embodiments are configured with cavities, gaps, and or tabs defined between the tape member and glass web via the discontinuous adhesive to identify one or more initiation sites for facilitated removal of the edge tape from at least a portion of the glass web.

In one aspect, a glass web assembly is provided, comprising: a glass web having two major surfaces, including: a first face and a second face, and two edges, a first edge and a second edge, wherein the glass web comprises a thickness sufficient to be retained in a roll-to-roll flexible glass application; and a first edge tape positioned along an edge region of the glass web, extending from the first face adjacent to the first edge, the first edge, and the second face adjacent to the first edge, wherein the edge tape is configured with: a tape member defining the dimensions (e.g. length and width of the edge tape; an adhesive configured between the tape member and an edge region of the glass web to adhere at least a portion of the tape member to at least a portion of an edge region of the glass web, wherein the adhesive is configured on a surface of the tape member in a discontinuous manner such that, via the via the discontinuous manner of the adhesive on the tape member, at least one: cavity or gap is defined between the tape member and the glass web edge region.

In some embodiments, a second edge tape is positioned along an edge region of the glass web, extending from the first face adjacent to the second edge, the second edge, and the second face adjacent to the second edge, wherein the second edge tape is configured as the first edge tape.

In some embodiments, the adhesive is configured in two stripes, a first stripe positioned adjacent to the edge of the tape member's width and extending along the length of the tape member, and a second stripe positioned adjacent to the opposing edge of the tape member's width and extending along the length of the tape member, to define the discontinuous adhesive on the tape member.

In some embodiments, via the edge tape the glass web assembly is configured with an edge cavity adjacent to the first edge of the glass web.

In some embodiments, the adhesive is configured in two stripes, a first stripe positioned adjacent to the edge of the tape member's width and extending along the length of the tape member, and a second stripe positioned adjacent to the opposing edge of the tape member's width and extending along the length of the tape member, to define the discontinuous adhesive on the tape member.

In some embodiments, via the edge tape the glass web assembly is configured with an edge cavity adjacent to the first edge of the glass web.

In some embodiments, the adhesive is configured in one stripe, wherein the stripe is positioned in a central position respective to the tape member's width and extending a predetermined location in each direction and terminating a positions to provide an adhesive width less than the tape member width, thereby defining the discontinuous adhesive on the tape member.

In some embodiments, via the edge tape, the glass web assembly is configured with two opposing gaps, a first face to first tape portion gap and a second face to second tape portion gap.

In some embodiments, the first face to first tape portion gap defines a first tab portion adjacent and positioned in spaced relation to the first face of the glass web.

In some embodiments, the second face to second tape portion gap defines a second tab portion adjacent and positioned in spaced relation to the second face of the glass web.

In some embodiments, the adhesive is configured in two stripes positioned in spaced relation from each other, a first stripe positioned in spaced relation from a first edge of the tape member and a second stripe positioned adjacent to the second edge of the tape member's width, and extending along the length of the tape member, to define the discontinuous adhesive on the tape member.

In some embodiments, via the edge tape, the glass web assembly is configured with three opposing gaps, a first face to first tape portion gap, a second face to second tape portion gap, and an edge cavity (sometimes called an edge gap).

In some embodiments, the first face to first tape portion gap defines a first tab portion adjacent and positioned in spaced relation to the first face of the glass web.

In some embodiments, the second face to second tape portion gap defines a second tab portion adjacent and positioned in spaced relation to the second face of the glass web.

In some embodiments, via the edge tape the glass web assembly is configured with an edge cavity adjacent to the first edge of the glass web.

In some embodiments, the adhesive is configured in one stripe, wherein the stripe is positioned to correspond to the tape member's width and have a predetermined length, which is less than the tape member's length, thereby defining an adhesive region between two tailored gap regions on the tape member, to thereby define the discontinuous adhesive on the tape member.

In some embodiments, the tape member is configured with a plurality of lateral perforations, wherein each lateral perforation is configured to extend along the width of the tape member, further wherein each lateral perforation is configured to extend through at least a portion of the cross-sectional thickness of the tape member.

In some embodiments, the lateral perforation is configured along the edge of the adhesive region, between the adhesive region and tailored gap region of the edge tape.

In some embodiments, the glass web has a cross-sectional thickness of not greater than 350 microns.

In some embodiments, the glass web has a cross-sectional thickness of at least 50 microns to not greater than 350 microns.

In some embodiments, the glass web comprises a fusion formed glass.

In some embodiments, the glass web: a borosilicate glass, an aluminosilicate glass, or an aluminoakali glass.

In some embodiments, the glass web includes an inorganic glass.

In some embodiments, the glass web is an alkaline earth boro-aluminosilicate glass.

In some embodiments, the tape member comprises: a polyimide film, a PET film, and combinations thereof.

In some embodiments, the edge tape has a cross-sectional thickness of not greater than 100 microns.

In some embodiments, the adhesive comprises a cross-sectional thickness of 20 microns to not greater than 30 microns.

In some embodiments, the tape member comprises a cross-sectional thickness of between 40 microns and 80 microns.

In some embodiments, the tape member comprises a cross-sectional thickness of between 50 microns and 70 microns.

It is noted, in one or more of the aforementioned embodiments, a second edge tape is configurable as set out herein and positioned on a second edge region of the glass web, in accordance with one or more embodiments of the present disclosure.

Additional features and advantages will be set forth in the detailed description which follows and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION OF THE DRAWINGS

Figure 1:
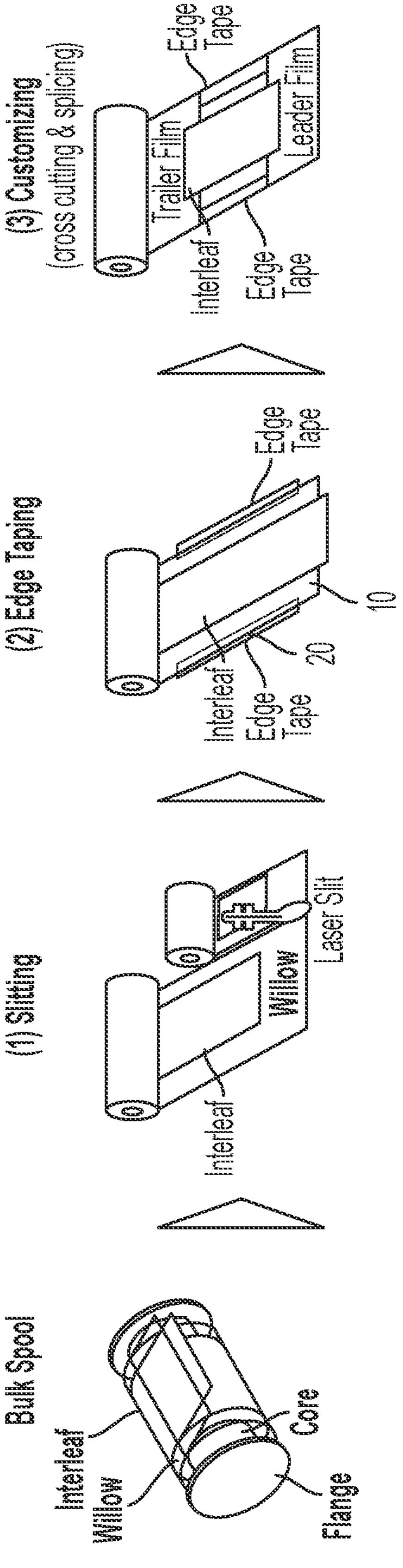
FIG. 1 depicts a schematic flow chart of an example of a flexible glass roll-to-roll (R2R) finishing process is depicted, in accordance with one or more embodiments of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Referring to FIG. 1, a glass bulk spool is directed towards three main processes to complete a customer spool (i.e. glass having the particular dimensions and/or specifications of the customer). FIG. 1 illustrates: (1) the slitting process, (2) the edge taping process, and (3) the customizing process (e.g. which may include cross-cutting and/or splicing).

Referring to the left-most image in FIG. 1, a top plan view of the assembly is provided, which illustrates the glass web having two edge tapes configured on either edge of the glass web, extending a portion of the way onto the first face and second face of the glass web to protect the corresponding edges (first edge and second edge) of the glass web.

Figure 2:
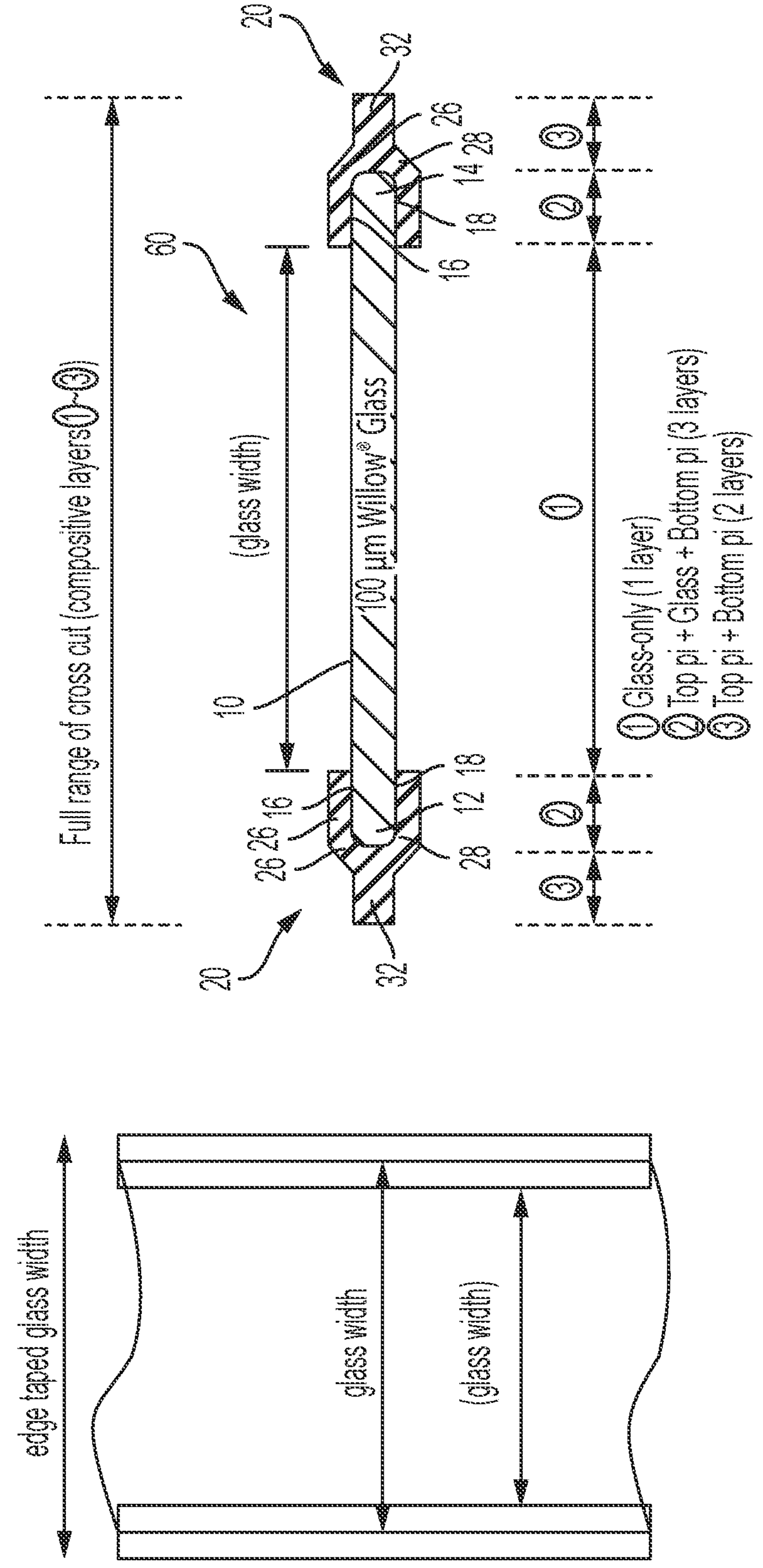
FIG. 2 depicts schematic views of a generic assembly (glass web and tailored edge tape) in accordance with one or more embodiments of the present disclosure.

Also, referring to the right-most image in FIG. 2, a cut-away side view of the assembly is provided. Here, the assembly 60 includes Willow® Glass having a cross-sectional thickness of 100 microns is depicted (commercially available through Corning Incorporated) as an example of a thin, flexible glass, or glass web 10. The glass web 10 is configured with a first face 16, second face 18, a first edge 12, and second edge 14, which cooperate to define the dimensions of the glass web 10.

Referring to the first edge 12, an edge tape 20 is configured around the first edge 12, such that the first tape portion 26 contact the first face 16 of the glass web 10, and the second tape portion 28 contacts the second face 18 of the glass web 10. The edge tape portion 32 is the remainder of the edge tape 20, which provides a small flange-like edge tape portion 32 as the edge tape 20 is configured from the first face 16 to the second face 18 of the glass web.

Referring to the second edge 14, an edge tape 20 is configured around the second edge 14, such that the first tape portion 26 contact the first face 16 of the glass web 10, and the second tape portion 28 contacts the second face 18 of the glass web 10. The edge tape portion 32 is the remainder of the edge tape 20, which provides a small flange-like edge tape portion 32 as the edge tape 20 is configured from the first face 16 to the second face 18 of the glass web.

As shown here, the assembly 60 is a generic configuration, but it is noted that the edge tape 20 is configurable as one or more of the embodiments detailed herein, which provide discontinuous adhesive portions to promote efficient removal (e.g. partial removal) of the edge tape 20, as required for downstream processing (e.g. customization).

As shown in circled numbers (1), (2) and (3): (1) refers to the portion of the assembly 60 which is only the glass web 10 (e.g. configured in the center region of the assembly as compared to the glass width); (2) refers to the portion of the assembly 60 where the edge tape 20 is configured around the first edge 12 and second edge 14, such that the cross-sectional thickness includes the glass web, the first tape portion 26; and the second tape portion 28, and adhesive (i.e. depending on which embodiment is utilized); and (3) refers to the edge tape portion 32 adjacent to the edges 12 or 14 and not in direct contact with the glass web 10, such that the cross-sectional thickness only includes the edge tape (e.g. tape member 22 and adhesive, depending on which embodiment is utilized).

In one non-limiting example, the edge tape is configured with a width of approximately 24 mm, including a perforated centerline to facilitate directing the edge tape into configuration with the first face and second face of the glass web. In some embodiments, the thickness of the edge tape is approximately 75 microns, with the tape member having a thickness of 50 microns and the adhesive having a thickness of approximately 25 microns. In the glass R2R edge taping process, the edge tape is bent around the perforated centerline and then applied, via the adhesive regions/portions to a glass web first edge or second edge. As depicted in the drawings, there is depicted an example overlap section of the edge tape to glass web of approximately 7 mm in length, with the edge tape portion length of approximately 5 mm.

Figure 3:
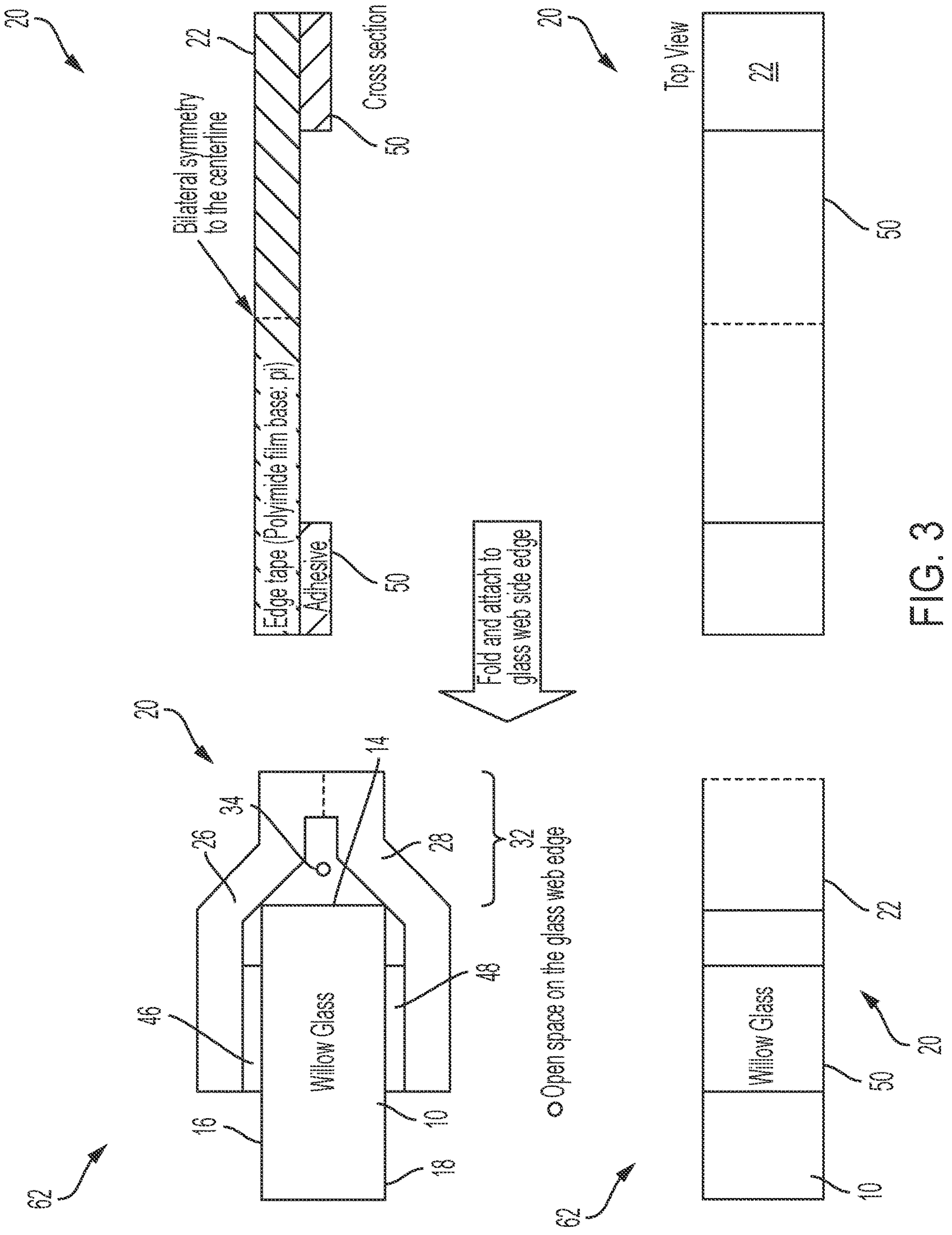
FIG. 3 provides several views of an embodiment of an edge tape and a corresponding assembly (glass web having edge tape configured thereon), in accordance with one or more embodiments of the present disclosure.
Figure 4:
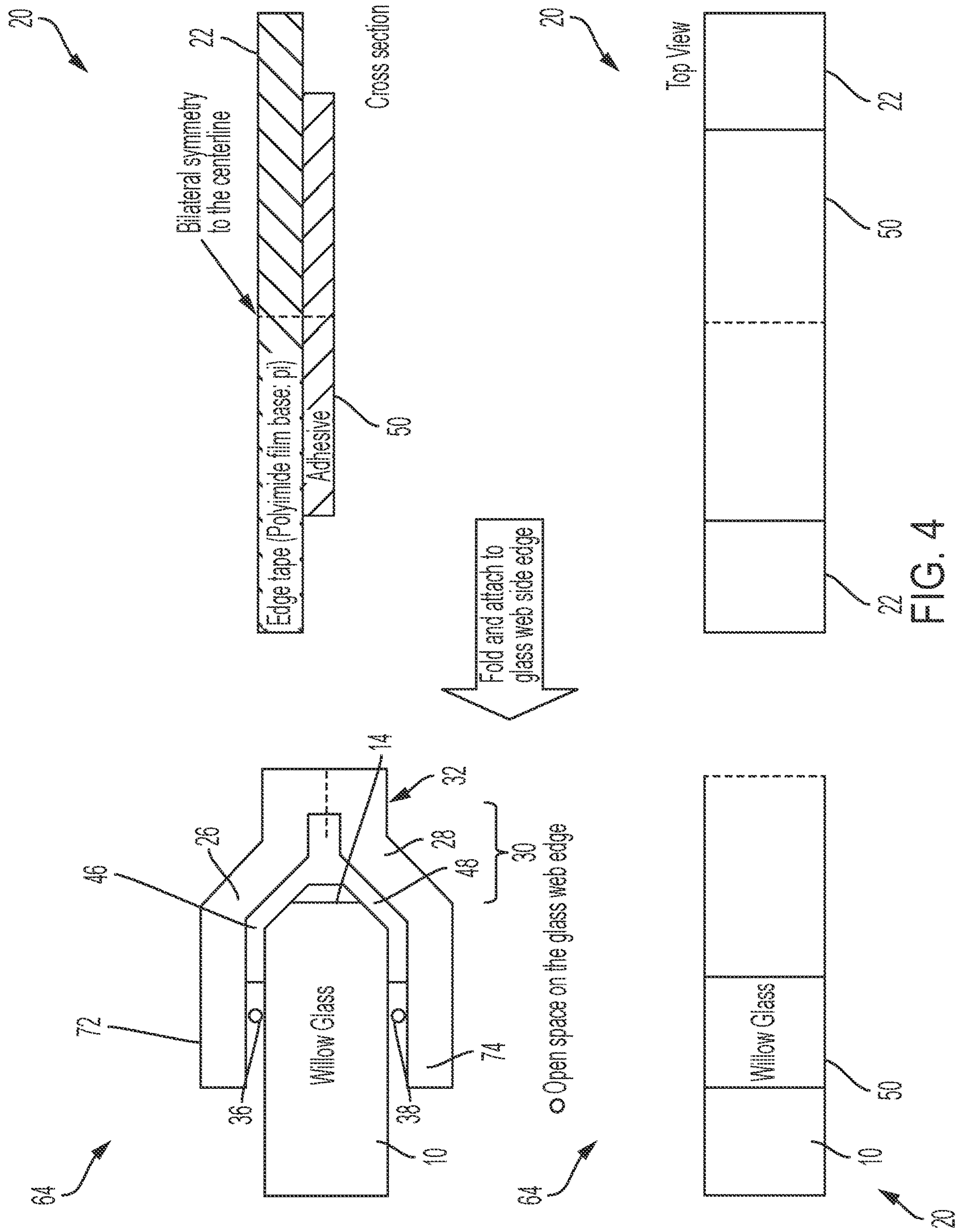
FIG. 4 provides several views of an embodiment of an edge tape and a corresponding assembly (glass web having edge tape configured thereon), in accordance with one or more embodiments of the present disclosure.
Figure 5:
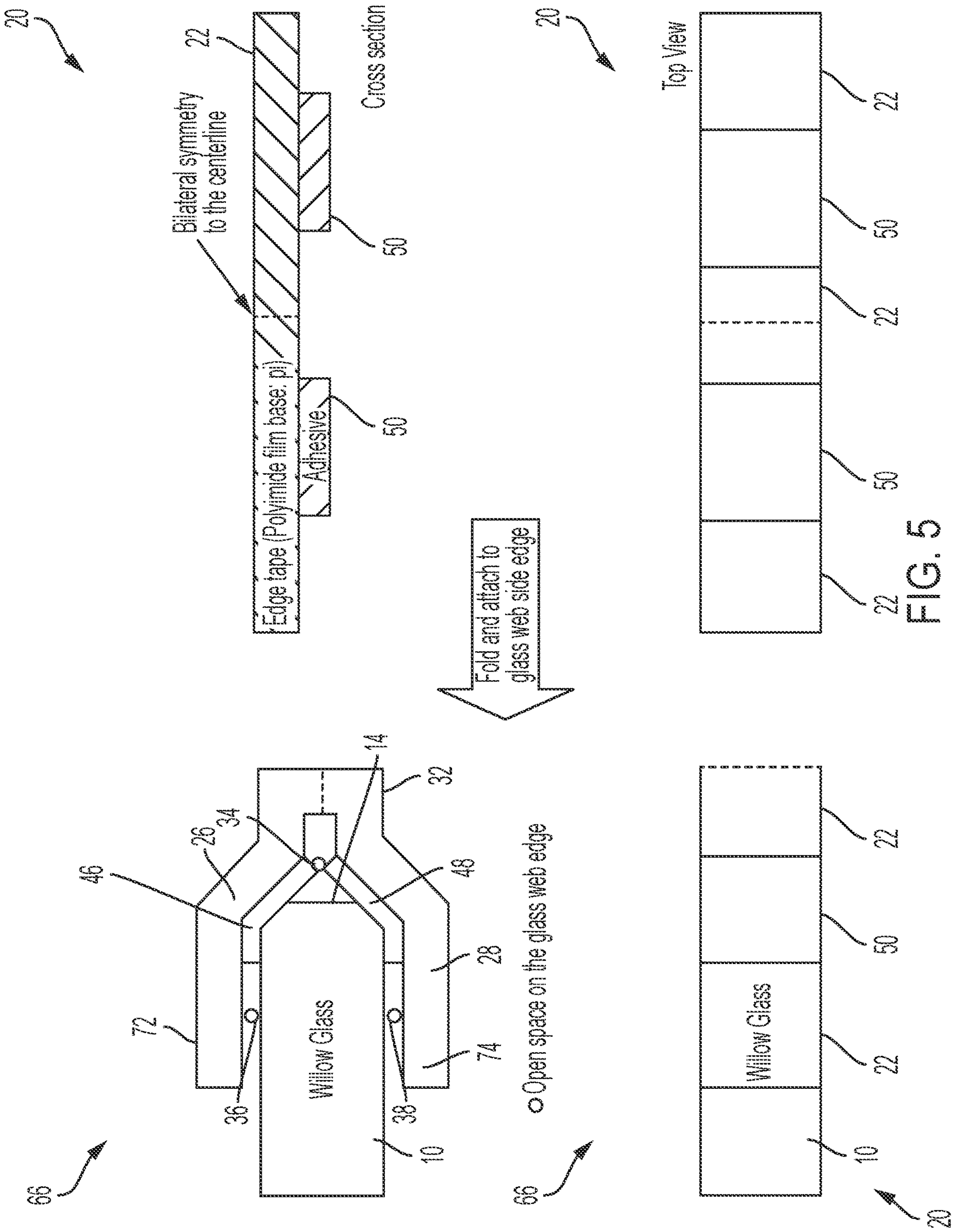
FIG. 5 provides several views of an embodiment of an edge tape and a corresponding assembly (glass web having edge tape configured thereon), in accordance with one or more embodiments of the present disclosure.

Referring to FIG. 3 through FIG. 5, a similar arrangement of views of the different embodiments is utilized, in which: the right side of the drawing depicts the embodied edge tape 20, including the adhesive 50 area design on the tape member 20. The upper right schematic drawing is a cut-away side view of the edge tape 20, while the lower right schematic drawing is a top plan view of the edge tape 20, in accordance with one or more embodiments of the present disclosure. The left side of the drawing depicts the embodied assembly 60 (i.e. 62, 64, or 66), which is a close up of the second edge 14 of the glass web 10 and edge tape 20 configured thereon. The upper left side depicts a cross-sectional side view of the assembly, while the lower left side depicts a top plan view of the assembly, in accordance with one or more embodiments of the present disclosure.

Referring to FIG. 3, the right-most schematic images depict an embodiment of the edge tape 20 and assembly 62, in which the edge tape 20 is configured with discontinuous adhesive 50, such that the adhesive 50 is located along a surface of the tape member 22 towards the edge regions of the tape member 22, such that the adhesive 50 does not extend across the middle portion of the tape member 22 surface, providing a central region of the edge tape 20 that has no adhesive 50.

Referring to the left-most schematic images, the edge tape 20 having adhesive 50 configured only on its edges on a major surface and not along its central portion then configures onto the glass web 10 to provide an assembly 62 having a non-adhered, open region of edge tape 20 adjacent to the second edge 14, as defined by the area between the first face 16 and second face 18 of the glass web 10. As such, the edge tape 20 is adhered to the glass web 10 at two regions: the first face adhesive portion 46, configured between the first tape portion 26 and the first face 16 of the glass web 10 and the second face adhesive portion 48, configured between the second tape portion 28 and the second face 18 of the glass web 10. An edge cavity 34 is defined on the glass assembly 62, between the second edge 14 and the tape member 22, as represented by the edge tape portion 32.

Referring to FIG. 4, the right-most schematic images depict an embodiment of the edge tape 20 and assembly 64, in which the edge tape 20 is configured with discontinuous adhesive 50, such that the adhesive 50 is located along a surface of the tape member 22 towards the central regions of the tape member 22 length, such that the adhesive 50 does not extend across the entire surface length of the tape member 22 to reach the edges of the tape member. In such configuration, the edge tape 20 is configured with an adhesive 50 in the central region of the edge tape, but no adhesive towards the edges (first and second edges) of the tape member 22.

Referring to the left-most schematic images, the edge tape 20 having adhesive 50 configured only in its central portion of a major surface and not along its first edge and second edge. As such, when configured onto the glass web 10 to provide an assembly 64, there are two corresponding non-adhered portions of the tape member 22, which have corresponding open regions/gaps (40, 42). Here, the edge tape 20 includes adhesive that corresponds to the position of the second edge 14 to define the edge adhesive portion 30, and it is adhered to the second edge 14 and around to a portion of the first surface 16 and second surface 18 of the glass web. The discontinuous adhesive 50 configures the assembly 64 into two tabs, a first tape member tab 72 and a second tape member tab 74 on the edge tape. The first tape member tab 72 corresponds to the portion of the first tape portion 26 that is not adhered/laminated to the first surface 16 of the glass web, such that a first face-to-tape cavity 36 is defined therebetween. The second tape member tab 74 corresponds to the portion of the second tape portion 28 that is not adhered/laminated to the second surface 18 of the glass web 10, such that a second face-to-tape cavity 38 is defined therebetween.

Referring to FIG. 5, the right-most schematic images depict an embodiment of the edge tape 20 and assembly 66, in which the edge tape 20 is configured with discontinuous adhesive 50, such that the adhesive 50 is located along a surface of the tape member 22 towards the edge regions of the tape member 22 but not extending to the edges of the tape member 22, such that the adhesive 50 does not extend across the middle portion/central portion of the tape member 22 surface and such that the adhesive does not extend all the way to the edges of the tape member 22. In this configuration, there is no adhesive 50 immediately opposite the edge regions of the tape member and in the central-most position of the tape member 22.

Referring to the left-most schematic images, the edge tape 20 having adhesive 50 configured as set out above, then configures onto the glass web 10 to provide an assembly 66 having a three non-adhered, open region of edge tape 20. One such non-adhered, open region is defined by edge cavity 34 (also called edge gap 44, since there is at least some adhesive present in the cavity as compared to the embodied FIG. 3), which is adjacent to the second edge 14, as defined by the area between the first face 16 and second face 18 of the glass web 10. The other two non-adhered region of edge tape 20 have corresponding open regions/gaps (40, 42). The discontinuous adhesive 50 configures the assembly 66 into two tabs, a first tape member tab 72 and a second tape member tab 74 on the edge tape. The first tape member tab 72 corresponds to the portion of the first tape portion 26 that is not adhered/laminated to the first surface 16 of the glass web, such that a first face-to-tape cavity 36 (sometimes referred to as first face to first tape portion gap 40, since the configuration/length slightly differs from FIG. 4) is defined therebetween. The second tape member tab 74 corresponds to the portion of the second tape portion 28 that is not adhered/laminated to the second surface 18 of the glass web 10, such that a second face-to-tape cavity 38 is defined therebetween (sometimes referred to as second face to second tape portion gap 42, since the configuration/length slightly differs from FIG. 4).

Figure 6B:
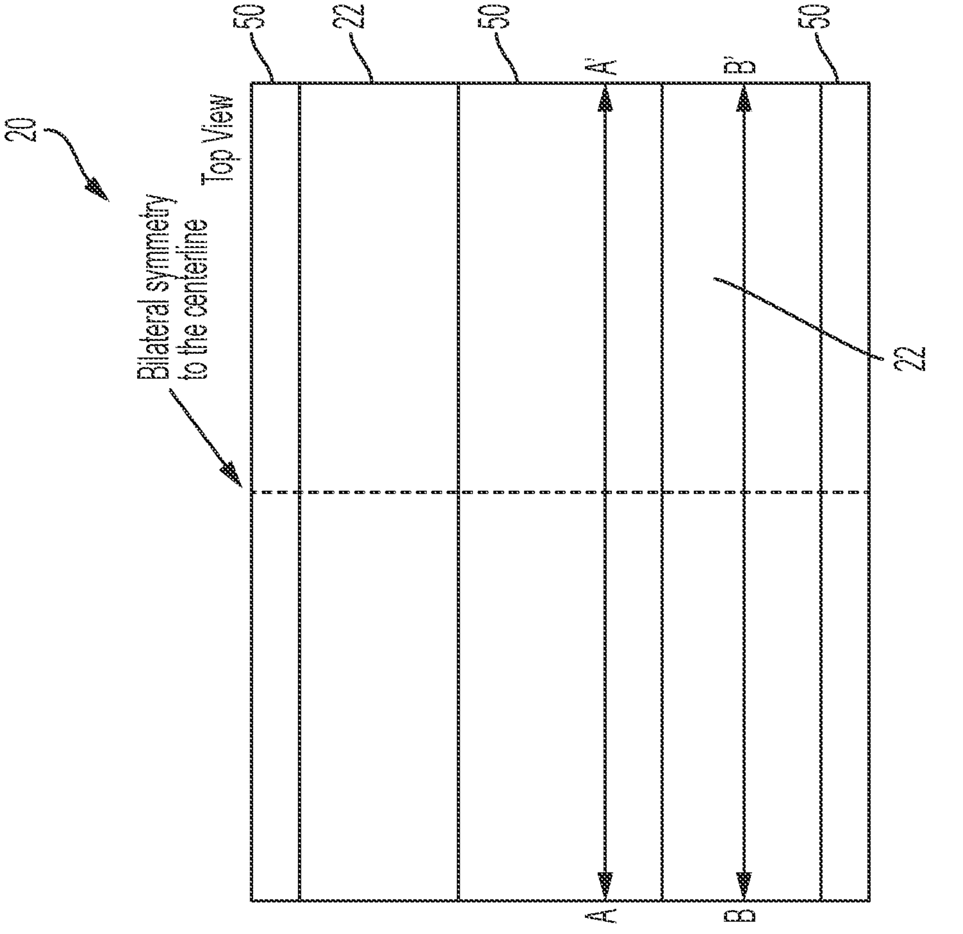
FIGS. 6A and 6B provide two views of an embodiment of an edge tape and a corresponding assembly (glass web having edge tape configured thereon), in accordance with one or more embodiments of the present disclosure.

Referring to FIG. 6, another embodiment is depicted, in which the edge tape 20 depicted in FIG. 6B shows different regions along the surface area of the tape member 22. The adhesive 50 area is configured along the length of the tape member 22 and at a predetermined width along the tape member 22, such that an adhesive region 56 is defined. In In other regions on the tape member 22, there is no adhesive along the length of the tape member and corresponding to a predetermined width along the tape member 22, in an adjacent position to an adhesive region 56, such that a tailored gap region (e.g. non-adhesive region) is defined in spaced relation, between two adhesive regions 56 along the edge tape 20. As such, FIG. 6B depicts a patterned edge tape 20 having alternating/iterative regions of adhesive region 56 and tailored gap region 58 configured along the length of the tape member 22. FIG. 6A depicts the assembly 68 having edge tape 20 with iterative adhesive regions 56 and tailored gap regions 58 along the length of the glass web 10.

Figure 6A:
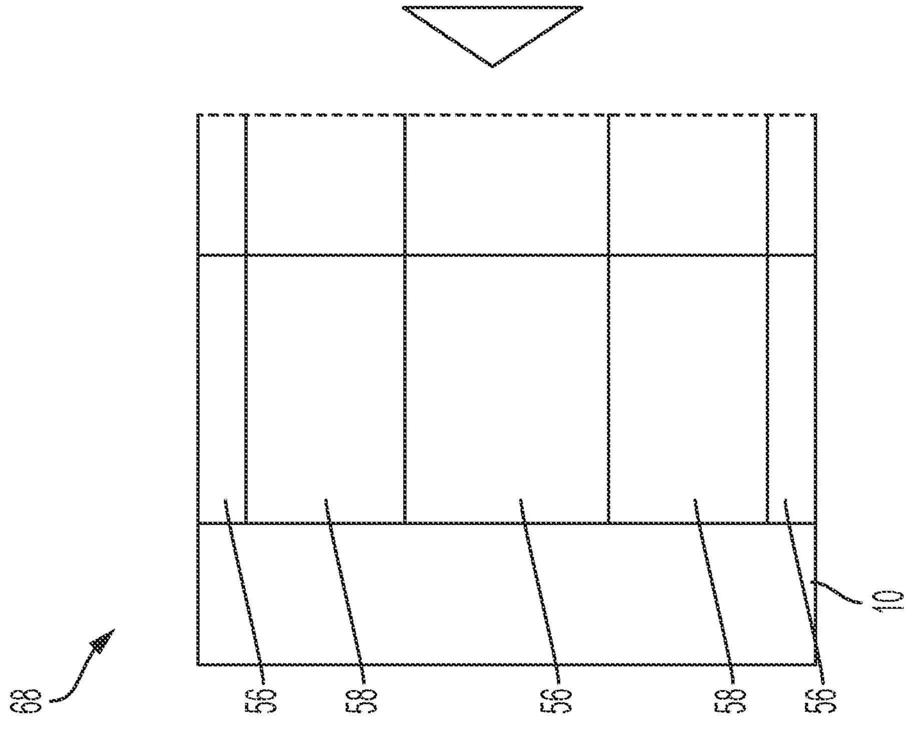
Figure 6D:
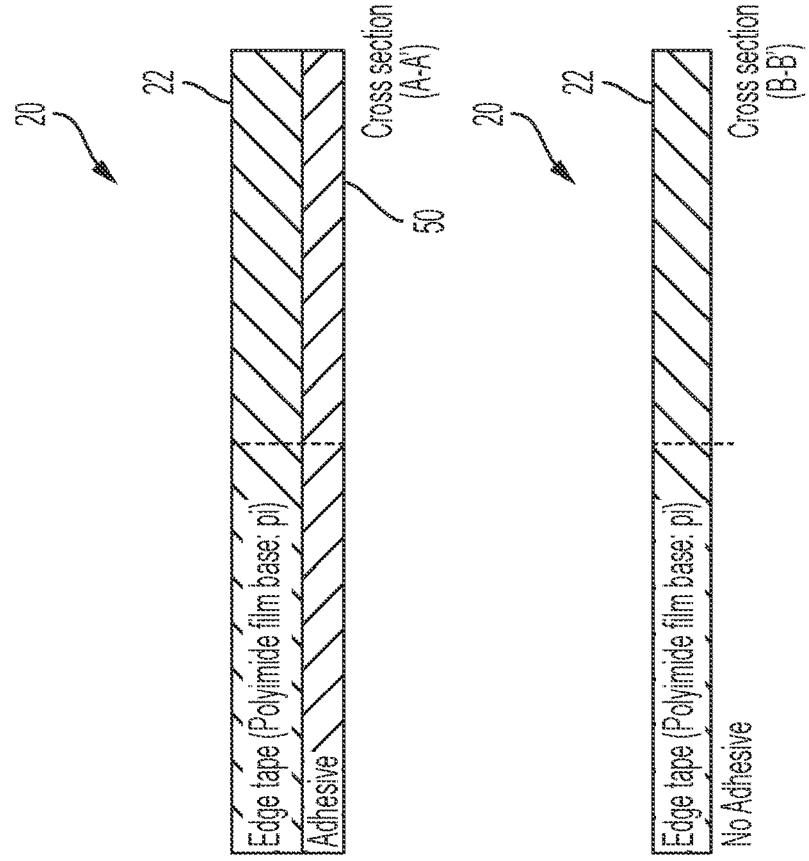
FIGS. 6C and 6D provide two additional views of the embodiment depicted in FIG. 6A and FIG. 6B, depicting the edge tape and a corresponding assembly (glass web having edge tape configured thereon), in accordance with one or more embodiments of the present disclosure.
Figure 6C:
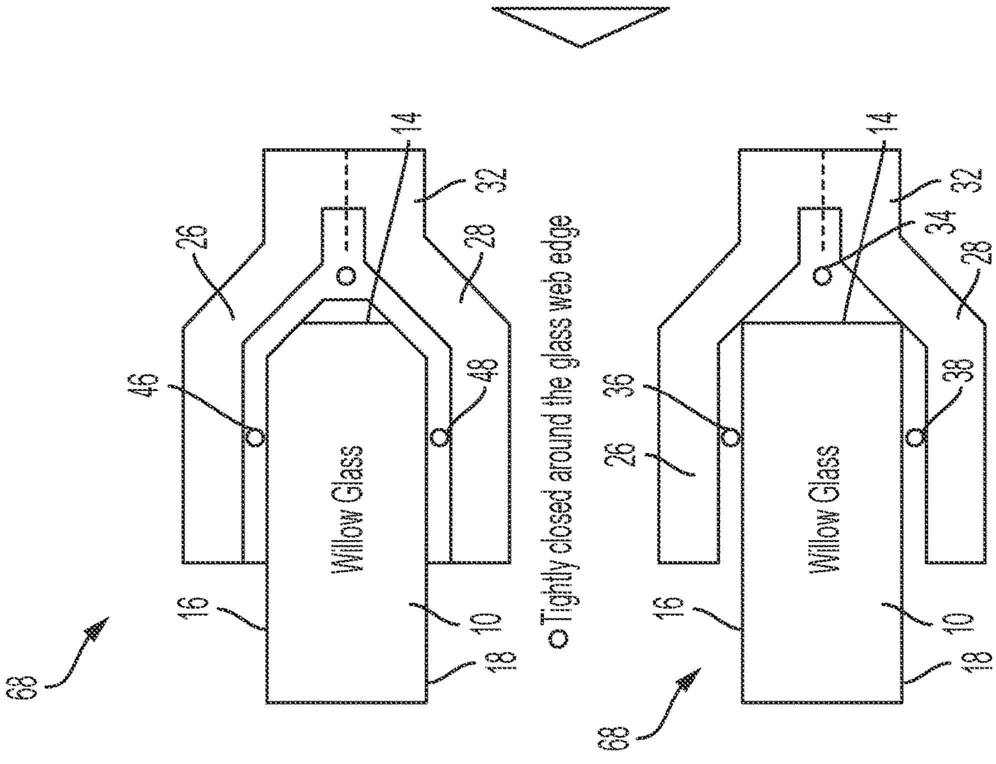

FIGS. 6C and 6D depict cross-sectional views of the assembly 68 (left views) and edge tape (right views), as set out in FIGS. 6A and 6B.

FIG. 6C corresponds to position A-A marked on FIG. 6B (and extrapolated onto 6A assembly 68). Referring to the edge tape 20 on the uppermost right-hand side of FIG. 6C, the adhesive region includes adhesive 50 that extends along the entire cross-sectional width of the tape member 22. As such, when configured into the assembly 68, this adhesive region 56 provides an adhered/laminated tape member 22 that is fully attached to the glass web at various regions between the edge tape 20 and glass web 10 edge region.

FIG. 6D corresponds to position B-B marked on FIG. 6B (and extrapolated onto 6A assembly 68). Referring to the edge tape 20 on the lowermost right-hand side of FIG. 6D, the tape member 22 has no adhesive along its cross-sectional width. As such, when fully configured into the assembly, the tape member 22 remains in spaced relation from the glass web edge region, defining a continuous cavity 34 between tape member 22 edges and glass web surfaces and edge (e.g. corresponding to first face to tape cavity 36, edge cavity 34, and second face to tape cavity 38). It's noted, the alternating configuration of adhesive region 56 to tailored gap region 58 is designed to retain the tape member 22 in the tailored gap region in close, spaced configuration with the glass web as the outer edges of the tailored gap region as adjacent to the adhesive region 56.

Figure 7:
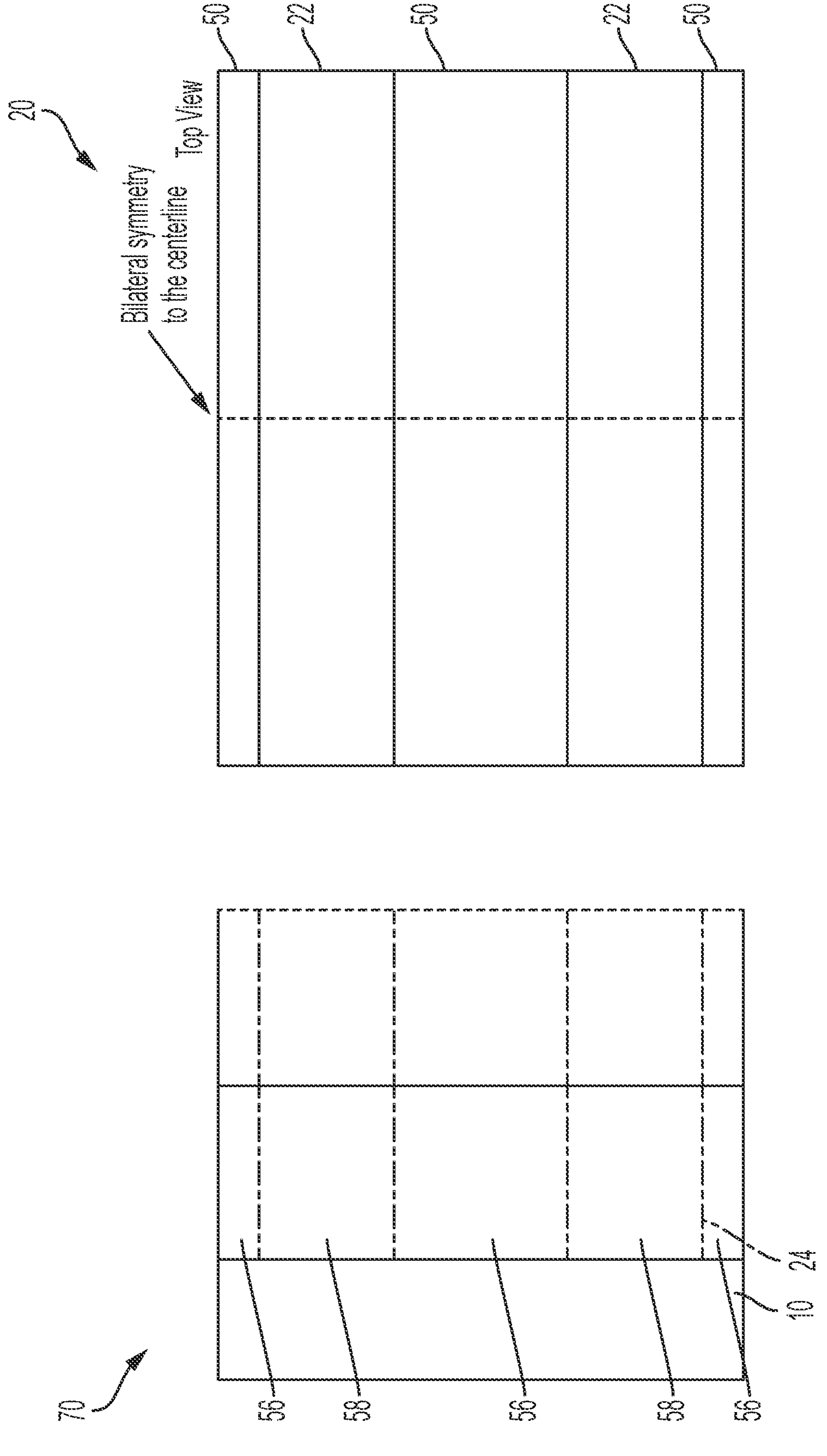
FIG. 7 provides two views of an embodiment of an edge tape and a corresponding assembly (glass web having edge tape configured thereon), in accordance with one or more embodiments of the present disclosure.

Referring to FIG. 7, the embodiment of FIG. 6 is modified, with additional feature of a lateral tape perforations 24 on the assembly 70. With this configuration, portion(s) of the tape member 22 at the edges of a tailored gap region can be removed via the perforation, such that processing of the glass web unhindered by the edge tape or tape member can be completed. As shown, the lateral tape perforations 24 extend from one edge of the edge tape 20 to the other edge of the edge tape 20 along the width of the edge tape 20.

The edge tape includes a tape member (e.g. a film, polyimide (PI) film, or PET film) and an adhesive on one of the major faces of the tape member, where the adhesive is configured to adhere (e.g. firmly laminate) the tape member to the edge(s) of the glass web. The edge tape fits along the side edges of the glass web in order to protect the glass side edges from breakage and/or to help glass web handling. Since portions or areas of the edge tape are removed to enable the customizing process (e.g. cross-cutting the customer roll by the defined length), the tailored adhesive regions promote a discontinuous lamination with one or more cavities or tabs defined between the tape member and the glass web, such that removal of at least a portion of the edge tape is facilitated.

The cavities and/or open regions defined by one or more of the edge tape configured on glass webs in the assemblies detailed herein are configured to enable implementation of various tools or apparatuses to peel off the edge tape from the glass web side edge in a mechanical fashion, to enable downstream processing (e.g. customization and/or cross-cutting).

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Many variations and modifications may be made to the above-described embodiments of the disclosure without departing substantially from the spirit and various principles of the disclosure. All such modifications and variations are intended to be included herein within the scope of this disclosure and protected by the following claims.

REFERENCE NUMBERS

Glass web 10
First edge 12
Second edge 14
First face 16
Second face 18
Edge tape 20
Tape member 22
Lateral tape perforations 24
First tape portion 26
Second tape portion 28
Edge tape portion 32
Edge cavity 34
First face to tape cavity 36
Second face to tape cavity 38
First face to first tape portion gap 40
Second face to second tape portion gap 42
Edge gap 44
Adhesive 50
First face adhesive portion 46
Second face adhesive portion 48
Edge adhesive portion 30
First face and edge adhesive portion 52
Second face and edge adhesive portion 54
Adhesive region 56
Tailored gap region (e.g. non-adhesive region) 58
First tape member tab 72
Second tape member tab 74
Generic embodiment: Assembly 60 (e.g. glass web+tailored edge tape 20)
Embodiment 1: 62
Embodiment 2: 64
Embodiment 3: 66
Embodiment 4: 68
Embodiment 5: 70

What is claimed is:

1. A glass web assembly, comprising:

a glass web having two major surfaces, including: a first face and a second face, and two edges, a first edge and a second edge, wherein the glass web comprises a thickness sufficient to be retained in a roll-to-roll flexible glass application; and a first edge tape positioned along an edge region of the glass web, extending from the first face adjacent to the first edge, the first edge, and the second face adjacent to the first edge, wherein the first edge tape is configured with:

a tape member defining dimensions of the edge tape;

an adhesive configured between the tape member and an edge region of the glass web to adhere at least a portion of the tape member to at least a portion of the edge region of the glass web, wherein the adhesive is configured on a surface of the tape member in a discontinuous manner such that, via the discontinuous manner of the adhesive on the tape member, at least one of a cavity and a gap is defined between the tape member and the edge region of the glass web;

wherein the adhesive is configured in one stripe, wherein the stripe is positioned to correspond to a width of the tape member and have a predetermined length, which is less than a length of the tape member, thereby defining an adhesive region between two tailored gap regions on the tape member, to thereby define the adhesive in the discontinuous manner on the tape member; and wherein the tape member comprises a plurality of lateral perforations, wherein each lateral perforation extends along the width of the tape member, further wherein each lateral perforation extends through at least a portion of the cross-sectional thickness of the tape member.

2. The glass web assembly of claim 1, wherein a second edge tape is positioned along an edge region of the glass web, extending from the first face adjacent to the second edge, the second edge, and the second face adjacent to the second edge, wherein the second edge tape is configured as the first edge tape.

3. The glass web of claim 1, wherein the lateral perforation is configured along the edge of the adhesive region, between the adhesive region and tailored gap region of the edge tape.

4. The glass web assembly of claim 1, wherein the glass web has a cross-sectional thickness of not greater than 350 microns.

5. The glass web assembly of claim 1, wherein the glass web has a cross-sectional thickness of at least 50 microns to not greater than 350 microns.

* * * * *